May 23, 1967     L. A. IDDINGS     3,320,817

ELECTROSTATICALLY SUSPENDED GYROSCOPE SIGNAL PICKOFF

Filed Feb. 25, 1965

INVENTOR
LLOYD A. IDDINGS

BY    *Claude Funkhouser*
                 ATTORNEY
     *Robert F. Beers*
                        AGENT

United States Patent Office 3,320,817
Patented May 23, 1967

3,320,817
ELECTROSTATICALLY SUSPENDED GYROSCOPE SIGNAL PICKOFF
Lloyd A. Iddings, Arlington, Va., assignor to the United States of America as represented by the Secretary of the Navy
Filed Feb. 25, 1965, Ser. No. 435,384
5 Claims. (Cl. 74—5.6)

The invention described herein may be manufactured and used by or for the Government for governmental purposes without the payment of any royalty thereon.

This invention relates generally to gyroscopic devices and more particularly to an improved attitude sensor for an electrically suspended gyroscopic member.

The gyroscope is used in a wide variety of applications where it is necessary to maintain provision of a reference from which either angular deviations or rates may be measured. The gyroscope usually is the basic element in automatic turning systems for missiles, airplanes, ships and torpedoes. Also, groups or sets of gyroscopes may be used in inertial guidance and navigation systems to provide a reference orthogonal coordinate system in inertial space.

One of the most important features of any gyroscope is its accuracy. An accurate gyroscope would maintain its spatial direction forever and measurements made with respect to the indicated direction would then be as accurate as the measuring equipment sensing this direction. A high accuracy gyroscope would of necessity have an extremely low drift rate and in order to obtain this low drift rate, the gyroscopic element must be supported with respect to its housing in such a way as to provide a frictionless contact. Gyroscopes having this support feature are a special type called floated gyroscopes. Some of the most common techniques of frictionless support of floated gyroscopic elements are the use of fluids, high air pressure, magnetic fields and electrostatic fields. When a gyroscopic element is suspended in one of the above environments and is rotating, its spin axis is not constrained to follow motions of its housing and the gyroscopic element or rotor element will have a fixed spin axis; and rotational movement of the housing will cause apparent relative rotation between the rotor element and the housing. Detecting this movement accurately and translating it into usable information is vital to obtaining an operational gyroscope.

Prior art measuring techniques for detecting rotational movement between the housing and the rotor element range from simple electromechanical devices to radiation responsive pickoffs. One technique uses a rotor element that is spherical, except for a disc-like protuberance that cuts the rotor into two hemispheres. As the rotor element is caused to rotate to a predetermined speed, tilt of the rotor is sensed by means of potentials applied to plates supported within the housing on areas opposite both sides of the protruding ring-disc portion of the rotor. Another technique widely used, at present, to detect the tilt of a spinning rotor with respect to its housing is an optical sensing means. Optical sensors and companion light sources are positioned about the rotor and are supported by the rotor housing. The rotor has a pattern applied to the surface of the rotor element which includes certain sectors having radiation properties and other sectors which are nonradiative. The optical pickoffs alternately "see" radiative and nonradiative sectors. Application of the varying output signal of the pickoffs to proper detecting means will give a signal that is the function of the latitude of the rotor element. The disadvantages of both of these techniques are that they require a complex rotor element and also that additional elements such as optical pickoffs and light sources are needed. These additional elements add to the complexity, expense and weight of the gyroscope instrument.

The present invention overcomes the disadvantages of the prior art by utilizing the support electrodes as sensing pickoffs. This provides elimination of additional sensing pickoffs and complex rotor surface configurations. According to the present invention, the rotor element of a free-running gyroscope is provided with a flat or discontinuity on its surface. As the rotor spins, the position of the flat as it passes the support electrodes will cause fluctuation in the support current proportional to the position of the flat to the supporting electrode which it is passing. This fluctuating signal is detected for each support electrode and the amount of tilt with respect to the spin axis may be determined from this information.

Therefore, it is an object of the present invention to provide an improved gyroscopic instrument.

Another object of the present invention is the provision of a simple and accurate rotor position measuring technique for gyroscopic instruments.

A further object of the present invention is the provision of a measuring apparatus that is adaptable for use with a free-running gyroscopic instrument.

Still another object of the present invention is the provision of a measuring apparatus that provides simplification of gyroscopic rotor design.

A further object of the present invention is the provision of a free-running gyroscopic instrument that does not need independent sensors or light sources.

Still another object of the present invention is the provision of an improved rotor design that allows more flexibility in gyroscope rotor motion in relation to the housing.

A further object of the present invention is the provision of a free-running gyroscopic rotor and associated support electrodes which will provide a highly accurate long-range navigational aid.

Still another object of the present invention is the provision of a pickoff technique for measuring relative rotation between a universally supported spinning sphere and its housing about any axis at an angle to the spin axis.

Another object of the present invention is the provision of a measuring apparatus in a free-running gyroscope that has far greater accuracy and sensitivity than any known gyroscopic device.

Still another object of the present invention is the provision of a method of sensing the relative rotation between an electrostatically supported spinning sphere and its housing about any axis at an angle to the spin axis.

Other objects, advantages and novel features of the invention will become apparent from the following detailed description of the invention when considered in conjunction with the accompanying drawings wherein.

Figure 1:
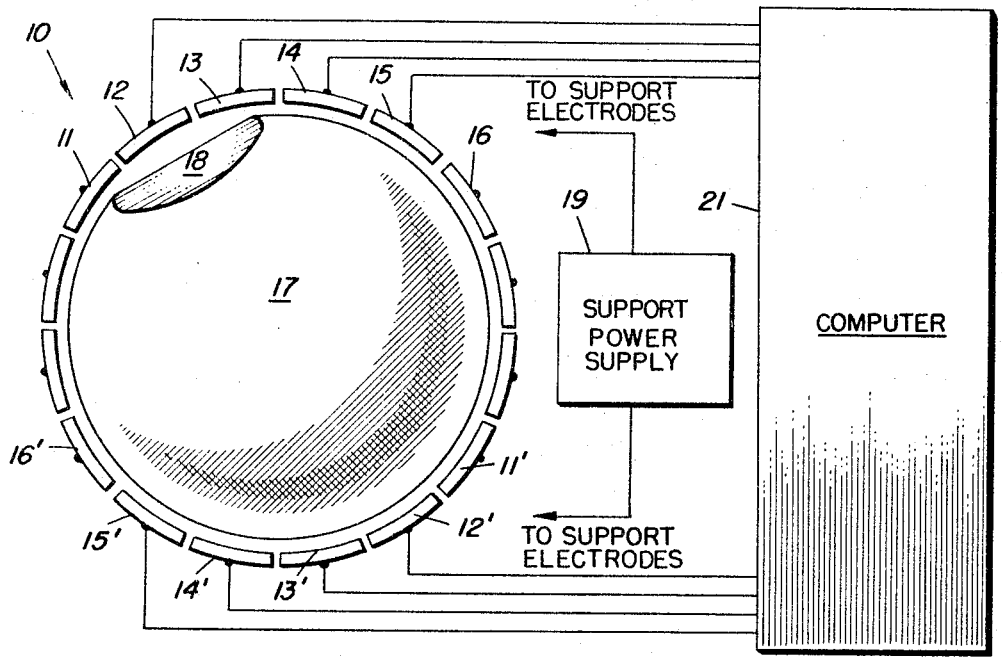
FIG. 1 is a schematic representation of a gyroscope rotor system supported by electrostatic means and having associated with it sensing and power supply means.

Referring now to FIG. 1, reference numeral 10 generally represents the rotor element and support electrodes of a floating gyroscope. Rotor element 17 is centrally positioned and supported by means of the electrostatic fields generated by opposite support electrodes; for example, 11, 11'; 12, 12'; 13, 13' and so forth around the other circumference of the rotor element 17.

Only a few of the electrodes are numbered since their respective functions are the same. Although the support electrodes shown as positioned completely around the other circumference, they may be only positioned along the orthogonal axis of the rotor about 17. Rotor element 17 is adapted to freely spin about a spin reference axis under the influence of a spinning or rotating impelling means, not shown. The rotating or impelling means may be in the form of additional windings positioned about the rotor. Whenever these windings are subjected to a rotating magnetic field and this field is applied to the rotor element 17, the unit will act as an induction motor causing the rotor to spin. Once the predetermined operating spin speed is reached, the magnetic field may be removed and the rotor 17 allowed to coast about its spin axis. Normally, to reduce the viscous drag, and to provide an insulating means between the support member and the rotating member 17, the space between these two elements is maintained at a partial vacuum. Operating the rotor in this manner, in a vacuumized chamber, will also provide a better voltage insulation of the respective support members from the outer surface of the rotor, since the spacing at which a voltage arc-over will occur will decrease significantly as the space is evacuated.

As discussed briefly above, the support plates illustrated in FIG. 1 and numbered 11 through 16 have opposing support elements numbered 11' through 16'. The support elements are positioned so that companion operating plates are positioned on opposite sides of the rotor member 17. Due to voltage applied across the members by support power supply 19, an electrostatic field will be generated between the plates and the supported member (rotor 17) with an attractive force resulting between each of the opposing plates and rotor member 17. Member 17 is completely supported whenever the forces due to the electrostatic field generated between the opposing pairs of support plates and the supported rotor 17, due to the acceleration including that of gravity, have a sum total of zero. The equilibrium state of the rotor is usually achieved so that when number 17 is rotating, it is centrally positioned and a maximum clearance will exist from its peripheral surface to the inner surfaces of all the support members. The support members, although not shown as such in the drawing, may be constructed to have a concave surface opposite the peripheral surface of rotor 17. This construction would allow for a closer and more efficient coupling to be maintained between the two elements. Also, this sort of construction would be necessary when a minimum of support electrodes were to be used.

Figure 2:
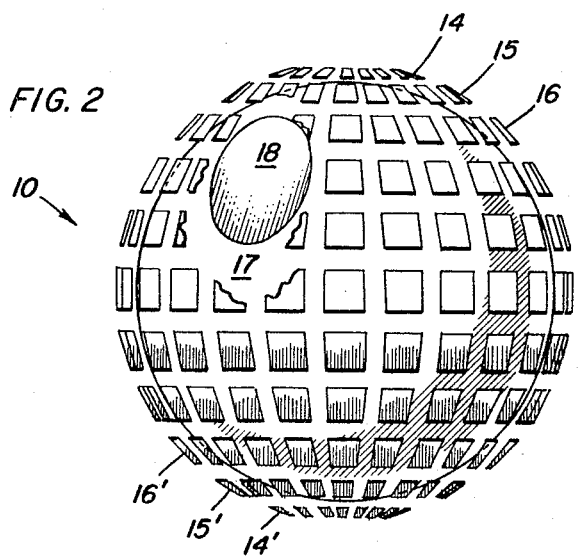
FIG. 2 is a perspective view of the gyroscope support electrodes positioned around the rotor element.

Now with reference to FIG. 2, there is shown a drawing of the rotor element 17 positioned between opposite pairs of support elements 14 to 16, and 14' to 16'. Connected to the opposing pairs of support electrodes; for example, 13 and 13' is an electrical lead which connects to a computer or detecting means 21. The respective inputs to the computer means 21 have suitable blocking means in each line to prevent blocking of the computer of any undesirable spurious electrical currents. These blocking means are not illustrated, but may be of any suitable type. Also connected to the respective electrical leads from the opposing support plates 13 and 13' is supply voltage source 19. In each of the respective lines connected to the input of the supply source 19 are filters which are used to block the signals caused by the discontinuity on the sphere from entering the power supply. These blocking filters may be of any suitable type and are not shown on the drawing. Only the support electrodes 13 to 15 and their companion members 13' to 15' are shown electrically connected to the computer means; the other support electrodes, of course, being connected in like manner.

As shown in the cross-sectional view illustrated in FIG. 1, the support electrodes are positioned completely about the outer surface of the spherical rotor member 17. The respective support members may also be positioned about the outer surface of the rotor element 17 along X, Y and Z axes; a plurality or a single support electrode may be used in each respective support axis, as desired.

In operation, the rotor element 17 is brought up to a predetermined spinning speed by a rotating means. Once the rotor 17 reaches its predetermined speed, the rotating force is removed and the rotor allowed to spin freely about its spin axis. The support voltage supply 19 which is connected to each of the electrodes will support the rotor element 17 in a central position with respect to the respective supporting electrodes and will allow the rotor to spin in a substantially frictionless environment. As illustrated in both FIGURES 1 and 2, the spherical member 17 has on its outer surface a flattened portion 18 or discontinuity of predetermined size. Usually this discontinuity will span the arc length of a single electrode, although it may be of such a size as to span more than one electrode. As the rotor 17 is spinning and passes the various support electrodes, the discontinuity 18 will cause the air gap between the outer surface of rotating member 17 and the adjacent electrode to change. This change in air gap causes a change in the current through the circuitry that connects the opposing pairs of electrodes.

This action will be explained by reference to FIG. 1. As illustrated in FIG. 1, the flattened portion or discontinuity of the outer surface of the spherical rotor element 17 as it passes beneath support electrode 12 is shown. As the flattened portion 18 passes beneath the support electrode 12, a change in air gap will result. This change will affect the support current that flows between electrode support member 12 and support member 12'. Also, the support currents through adjacent electrodes 11 and 13 may be affected, but the current change will not be as great. This change in current will be conducted through the electrical leads connected to the respective support members into the computer means 21. As the rotator member 17 further turns about its spin axis, it causes a change in air gap as it passes other support members causing a corresponding change of current occurring through these members. These varying currents in the respective electrodes are electrically conducted to the computer means and may be decoded in order to determine the position of the rotor member 17 with respect to the support housing as it is rotating in its spin axis. The details of the computer are not disclosed, since it may take a variety of configurations depending upon the particular type of output indication desired. Therefore, the sensing support signal, due to the flattened portion on the rotor 17, will then indicate the rotor position relative to any movement of the supporting case, and this sensing voltage will be an alternating current and will represent a difference in support current fluctuating at the predetermined rotor 17 spin speed.

It should be understood that while the support electrodes may all be used to sense the position of the rotor, it may be desired or prove more feasible in certain applications to use only support electrodes being orthogonally spaced with respect to each other. Orthogonal spacing may be desired to simplify the computing circuitry, but other spacings would work just as well with respect to obtaining correct sensing information.

The apparatus and technique disclosed provides a means of sensing the attitude of a freely rotating gyroscopic rotor element that is supported in an electrostatic field. This is done by utilizing the fluctuations in support current from electrodes. These current fluctuations are caused by a flattened portion on the rotating spherical member 17, and as this portion passes beneath the respective support electrodes, a current proportional to the position of the flat surface with respect to the support electrodes will be generated. Thus, by this means, the atttiude of the rotating sphere can be sensed regardless of its position with respect to the support housing. Therefore, the apparatus provides a simple, foolproof technique for determining the position of the rotor.

Obviously many modifications and variations of the present invention are possible in the light of the above teachings. It is therefore to be understood that within the scope of the appended claims the invention may be practiced otherwise than as specifically described.

What is claimed is:

1. A free gyroscopic apparatus for providing a reference orthogonal coordinate system in inertial space, comprising:
   plurality of support electrodes,
   spherically shaped rotor centrally supported by said support electrodes for providing a substantially frictionless environment for said rotor,
   said rotor adapted to be rotated about a spin axis,
   said rotor having a discontinuity on the peripheral surface, and
   means for measuring the position of said rotor spin axis with respect to the position of said support housing.

2. The apparatus of claim 1 wherein the plurality of support electrodes are concave and positioned substantially continuously around the peripheral surface of said rotor.

3. A free gyroscopic apparatus for providing a reference orthogonal coordinate system in inertial space, comprising:
   a spherical rotor having a discontinuity on its peripheral surface,
   plurality of electrodes positioned adjacent the peripheral surface of said rotor and having at least two electrodes in each of the three axis of said rotor,
   voltage means impressed on said plurality of electrodes for providing electrostatic support for said rotor and a substantially frictionless rotating environment,
   said rotor adapted to be rotated about a spin axis, and
   detecting means for sensing an electrical signal as the discontinuity of said rotor passes beneath each of said support electrodes,
   whereby the discontinuity changes the current flow as it passes beneath each of the plurality of electrodes by causing an air gap change between the electrode and the rotor.

4. The apparatus of claim 3 wherein the said plurality of electrodes are positioned about said rotor in opposing pairs.

5. A free gyroscopic apparatus for providing a reference orthogonal coordinate system in inertial space, comprising:
   plurality of support electrodes;
   spherically shaped rotor centrally supported by said support electrodes for providing a substantially frictionless environment for said rotor;
   said rotor adapted to be rotated about a spin axis; and
   means for measuring the position of said rotor spin axis with respect to the position of said support housing, wherein the measuring means comprises:
   a discontinuity on the peripheral surface of said rotor;
   said discontinuity causing a change in the clearance distance between said support electrodes and said spinning rotor; and
   electrical detection means for detecting the change in clearance as it passes beneath each of said plurality of support electrodes.

References Cited by the Examiner

UNITED STATES PATENTS

| | | | |
|---|---|---|---|
| 2,942,479 | 6/1960 | Hollmann | 74—5.6 |
| 3,017,777 | 1/1962 | Haeussermann | 74—5 |
| 3,209,602 | 10/1965 | Biderman | 74—5.6 |
| 3,262,325 | 7/1966 | Senstad | 74—5 |

FRED C. MATTERN, JR., *Primary Examiner.*

J. D. PUFFER, *Assistant Examiner.*